United States Patent [19]
Bean et al.

[11] 3,740,855
[45] June 26, 1973

[54] LENS CIRCUMFERENCE MEASURING INSTRUMENT

[76] Inventors: Frank J. Bean, 40 S. Franklin Street; John F. Sheridan, 75 Poole Circle, both of Holbrook, Mass. 02343

[22] Filed: Sept. 9, 1971
[21] Appl. No.: 178,937

[52] U.S. Cl. .............................................. 33/141 E
[51] Int. Cl. ............................................. G01b 3/12
[58] Field of Search .................. 33/174 A, 200, 141, 33/141.5, 142

[56] References Cited
UNITED STATES PATENTS

| | | | |
|---|---|---|---|
| 2,888,750 | 6/1959 | Hills | 33/141 E |
| 1,990,138 | 2/1935 | Schuster | 33/148 E |
| 2,975,630 | 3/1961 | Michel | 33/148 E |
| 526,849 | 10/1894 | Adler | 33/141 B |
| 2,677,891 | 5/1954 | Hansen | 33/141 E |
| 1,528,315 | 3/1925 | Barr et al. | 33/141 R |

Primary Examiner—Harry N. Haroian
Attorney—Barry R. Blaker

[57] ABSTRACT

There is disclosed a hand-held, manually operated instrument for measurement of the circumferences of lenses or the like. The instrument comprises a pincer means the jaws of which are resiliently urged to the closed position. Included in the jaw assembly are opposed rotatable platforms adapted to grip a lens workpiece therebetween. At least one of the platforms is manually rotatable through a drive shaft associated therewith and further comprises an indexing arrangement adapted to accurately index and signal the start and finish of 360° of rotation of the platform. Against the circumference of a lens workpiece held between the platforms there is resiliently biased a freely rotatable, laterally translatable measuring wheel. Upon rotation of the lens through 360° the measured circumference is read directly from a scale provided in association with the measuring wheel.

10 Claims, 4 Drawing Figures

PATENTED JUN 26 1973

LENS CIRCUMFERENCE MEASURING INSTRUMENT

BACKGROUND OF THE INVENTION

The present invention relates generally to measuring apparatus and is more particularly concerned with instruments for determining the circumference dimensions of optical lenses.

In the emplacement of an optical lens into its ultimate situs operandi it is often a necessary preliminary step to accurately determine the circumference of the lens. Such measurements are of particular necessity in the proper and secure fitting of lenses to eyeglass frames. In U.S. Pat. No. 2,888,750, Hills, June 2, 1959, there is disclosed an apparatus suitable for the accomplishment of said circumferential measurements. The Hills' apparatus comprises a support member carrying thereon a graduated dial from which dial there axially extends a sleeve. A lens, rotatably mounted between gripping jaws, is placed in side-by-side relation to said sleeve and the sleeve is urged against the lens perimeter. By means of an external crank mechanism the lens is then rotated and measurement of the circumference thereof is taken from the graduated dial. Upon completion of the measuring cycle, additional means are provided to (1) release the lens from the gripping jaws, and (2) concomitantly move the axially extending sleeve of the graduated dial out of contact with the lens. Also disclosed are means for limiting rotation of the lens through a preselected arc. Separate and distinct locking means are provided for the prevention of reverse or retrograde rotation of the lens upon completion of the measuring cycle.

While the apparatus disclosed by Hills accomplishes its principal purpose of accurate measurement of lens circumferences, it is, nonetheless, possessed of several distinct disadvantages. Firstly, by virtue of its complexity and large number of parts, said apparatus is relatively expensive. Too, said apparatus requires a relatively massive and heavy support frame in order to provide sufficient rigidity to maintain the numerous parts thereof in proper relationship to one another. Thus, Hills' measuring device is neither conveniently portable nor susceptible of hand-held operation. Said lack of portability represents a considerable detriment and inconvenience, particularly in optical shops wherein several workers at different locations may be fitting lenses and thus all require use of the circumference measuring device at or near their respective workbenches. Also, the limit and lock means disclosed by Hills are separate and distinct devices of substantial complexity and delicacy which must be exceedingly carefully fitted so as to operate in a cooperative and accurate manner. Moreover, said devices are externally mounted on the apparatus and are thus susceptible of accidental damage thereto, particularly during transport of the measuring apparatus.

Accordingly, there presently exists a distinct need for a simple, light weight, hand-held and accurate lens circumference measuring instrument. In accordance with the present invention, the aforementioned need has been met.

OBJECTS OF THE INVENTION

It is a principal object of the present invention to provide a novel hand-held lens circumference measuring instrument.

It is another object of the invention to provide a lens circumference measuring instrument characterized by its relatively few parts, simplicity of construction and accuracy of function.

Other objects and advantages of the instrument of the invention will in part be obvious and will in part appear hereinafter.

SUMMARY OF THE INVENTION

The above and other objects and advantages of the present invention are realized by an instrument broadly comprising a hand-held, resiliently biased to-the-closed position pincer means. The jaws of the pincer means are equipped with opposed abutting rotatable platforms adapted to receive in gripping relationship therebetween a lens workpiece. At least one of the platforms is adapted for manually driven rotation thereof by means of a drive shaft linkage associated therewith while the opposing platform is passively and freely rotatable with said driven platform. Additionally, the driven platform is provided with means for indexing and signalling the start and finish of 360° of rotation thereof. In a particularly preferred embodiment said means may take the form of a combination of a slot or depression located on the drive shaft adapted to receive in semi-locking relationship therewith a protuberance provided on a leaf spring biased thereagainst. The fixed end of the leaf spring is attached to the corresponding arm of the pincer means. A laterally translatable, freely rotatable measuring wheel is resiliently biased so as to urge and maintain the circumference thereof in contact with the circumference of the lens workpiece. A more complete understanding of the apparatus of the invention can be had by reference to the drawings forming part hereof.

DETAILED DESCRIPTION OF THE INVENTION

Figure 1:
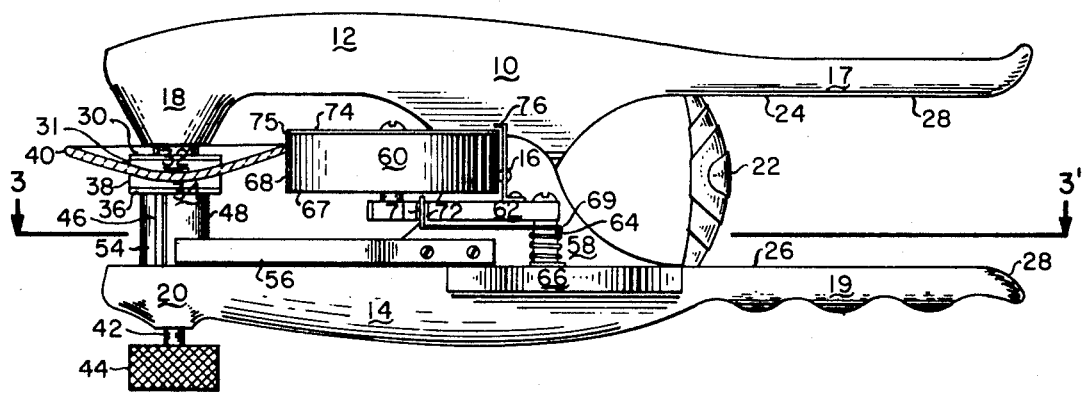
FIG. 1 is a schematic, diagrammatic side view of one embodiment of the lens circumference measuring instrument of the invention.
Figure 2:
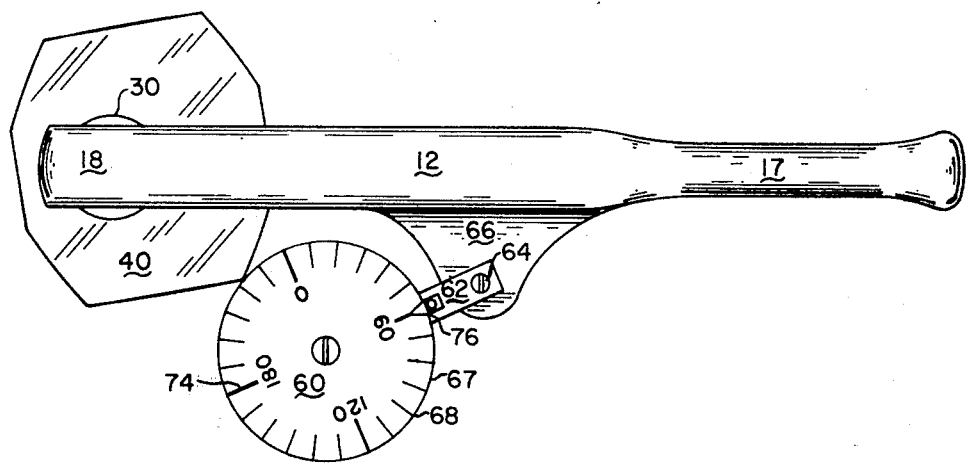
FIG. 2 is a schematic, diagrammatic top view of the instrument of FIG. 1.
Figure 3:
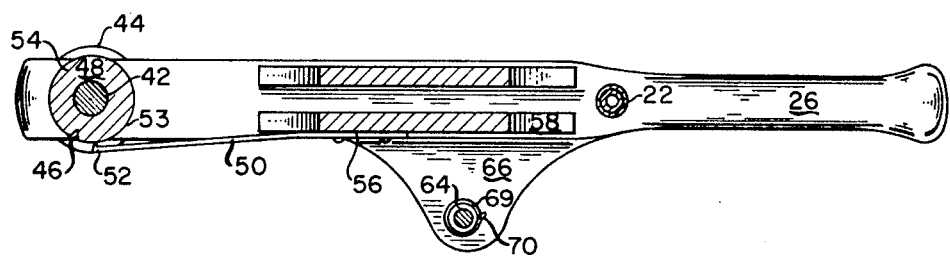
FIG. 3 is a schematic, diagrammatic, partially sectional top view of the instrument of FIG. 1, taken along line 3—3 thereof.

Referring now to FIGS. 1 through 4, wherein like reference numerals refer to like structural features, the apparatus of the invention comprises resiliently biased to-the-closed position pincer means 10 comprising upper arm 12 and lower arm 14, said pincer arms being pivotally joined at about the mid-lengths thereof at hinge point 16. The forward portions of arms 12 and 14 constitute upper and lower jaw members 18 and 20, respectively, of pincer means 10 and are resiliently biased to-the-closed position by any suitable means, such as by the action of compression spring 22 positioned behind 16 point 1 between handles 17 and 19. Said spring 22 may be conveniently anchored at its respective ends by means of stubs (not shown) projecting from the inner aspects 24 and 26 of handles 17 and 19, which stubs are seated within the spring coil. Taken in combination, the handles 17 and 19 constitute hand-grip means 28. Accordingly, by squeezing of said grip means 28, the biased to-the-closed position effect of spring 22 is overcome and jaw members 18 and 20 of pincer arms 12 and 14 are opened.

Extending vertically upward from the inner aspect of jaw member 20 of lower arm 14 is a rotatable platform 34 the lens bearing surface of which lies in a substantially horizontal plane. In a preferred embodiment of the invention, said platform 34 comprises a rigid underlying support member 36 and a resilient pad or washer 38 affixed thereto. In operation, said pad 38 bears resiliently against the corresponding side of a lens workpiece 40, thereby affording considerable protection against scratching or breakage thereof as well as presenting a non-slip surface to said workpiece. Additionally, said platform 34 is provided with means for manual rotation by fixation thereof to drive shaft 42 which extends through jaw member 20 of lower arm 14 and which shaft 42 terminates in a knob 44. Said knob 44 is of appropriate size and surface texture (such as by knurling thereof) to assure convenient and comfortable manual rotation of drive shaft 42 and platform 34.

In order that accurate measurement of the circumference of lens workpiece 40 may be effectuated it is of considerable importance that the driven platform 34 be provided with suitable means for precisely defining a complete revolution thereof, i.e., 360°. With respect to this acute need we have found that the provision of a detent or vertical slot 46 on drive shaft 42 in combination with an appropriately shaped and positioned leaf spring 50 constitutes a simple, effective means for fulfillment thereof. In a preferred embodiment the aforementioned slot/spring assembly is located generally within the confines of the space defined by jaw members 18 and 20. Adherence to this relationship causes said jaw members 18 and 20 to serve an additional important role; that being as a protective shield for said assembly. Accordingly, drive shaft 42 is provided with a detent or vertically oriented slot 46 located intermediate jaw member 20 of lower arm 14 and platform 34. Expeditiously, the burdens of wear and manufacturing tolerances necessary to achieve accurate 30°360°rotation of platform 34 are considerably eased when the diameter of that portion of drive shaft 42 bearing the detent or vertical slot 46 is substantial, for instance at least about ½ inch and even more preferably greater than about ⅝ inch. Therefore, as shown in the drawings, shaft 42 is provided with an enlarged portion 48 whereon vertical slot 46 is located. Said enlarged portion 48 may be integral with the drive shaft 42 or may take the form of a separate collet or collar 48 affixed thereto. The el tip 52 of leaf spring 50 is biased against surface 54 of enlarged portion 48 of drive shaft 42 and rides thereon throughout most of an operating cycle. Fixed end 56 of leaf spring 50 may be anchored to any convenient location on pincer means 10 in order to achieve proper biasing thereof. For instance, as shown, spring end 56 may be affixed to vertical stanchion 58 of lower pincer arm 20. Thus, at the start and finish of each measuring cycle el tip 52 of spring 50 is biased into its receiving slot 46, thereby providing a tactile and often audible signal to the operator as well as accurately indexing the platform 34.

In a preferred embodiment, slot 46 and tip 52 are of generally "v" shaped configuration. Said configuration provides excellent indexing of the platform 34 while also allowing for rotation thereof in either direction. If, however, it is desired that the rotation of platform 34 be restricted to one direction only, the shapes of said tip 52 and slot 46 may be appropriately altered such as, for instance, by providing singly beveled surfaces thereon; said beveled surfaces each being oriented in the desired direction of rotation.

In completion of the lens gripping and rotating structure, a rotatable platform 32 extends vertically downward from the inner aspect of upper jaw member 18 to coaxially oppose corresponding platform 34. Said platform 32 is affixed to said jaw member 18 in any suitable manner and is preferably provided with suitable bearings, such as roller or ball bearings, so as to assure passive and free rotation thereof with driven platform 34. Again, in a preferred construction, platform 32 comprises an underlying rigid support member 30 and a terminal resilient facing or pad 31.

Measurement of the circumference of lens workpiece 40 is achieved by accurate rotation thereof through 360° by means of the structure of the apparatus hereinbefore described while biasing the circumference of a measuring wheel against the circumference of the lens. Accordingly, a freely rotatable measuring wheel or cylinder 60 is mounted so as to rotate in substantially the same plane as platforms 32 and 34. Said wheel 60 is freely rotatable on vertical axle 61 and is further capable of lateral translation by mounting thereof on the free end of pivot arm 62. Said arm 62 is, in turn, pivotally attached to lower pincer arm 14 by means of vertical stud 64. Preferably, said lower pincer arm 14 comprises a laterally extending stanchion 66 to serve as the attach point for said pivot arm 62. The use of said stanchion 66 tends to minimize the rearward travel of wheel 60 as it is pushed laterally and arcuately outwardly by the circumference of lens 40. In order that circumference 68 of measuring wheel 60 be resiliently urged against the circumference of lens workpiece 40 arm 62 may be provided with coil spring means 69 coacting therewith. Stud 64 penetrates through the core of the spring and thus serves the further function of a fulcrum therefor. The base end of the spring 69 is seated in a suitable aperture 70 provided therefor in lateral stanchion 66 while the "free" or working end 71 thereof is seated in notch or aperture 72 of arm 62. In design consideration relating to the laterally translatable, freely rotatable measuring wheel assembly the length of arm 62 and diameter of wheel 60 should be taken fully into account with a view to the provision of an overall system in which the available lateral outward "throw" of wheel 60 is sufficient to accept lenses of the largest intended size to be measured. Further, the circumferential surface 68 of measuring wheel 60 should be sufficiently wide to assure contact thereof with the circumferences of lenses throughout the 360° measurement cycle. In a preferred embodiment of the invention said circumferential surface 68 of measuring wheel 60 comprises a thin elastomeric material covering 67 in order to provide an improved non-slip relationship of said surface 68 with the circumference of the lens workpiece 40. Said elastomeric cover 67, which may be composed of natural or synthetic rubber stock, should be no thicker than about 1/16 inch in order to preserve the accuracy potential of the instrument. The measuring wheel 60 is further equipped with a scale 74, preferably located on the upper surface thereof, and appropriately sized with respect to circumferential surface 68 so as to provide an accurate readout of the measured circumference of lens workpiece 40. Said scale 74 may be in the form of a separate bezel 75 attached mechanically to the wheel 60 or may be in the form of indicia engraved directly on the surface of the wheel. Completing the measuring wheel assembly there is provided a pointer 76 in fixed relationship with respect to scale 74 and which pointer is attached conveniently to arm 62.

In consideration of the diameter of the measuring wheel to be employed it is desirable to consider that rotation of the lens workpiece through 360° should preferably not result in more than one complete revolution of the measuring wheel 60. By adherence to this design principle there are avoided situations in which it becomes necessary to calculate the circumference of the lens by addition of the first full scale reading to the overrun reading. Presently, eyeglass lenses generally have circumferences ranging from about 100 to about 200 millimeters. Accordingly, with this specific purpose in mind, the diameter of measuring wheel 60 need not generally be greater than about 65 millimeters.

Figure 4:
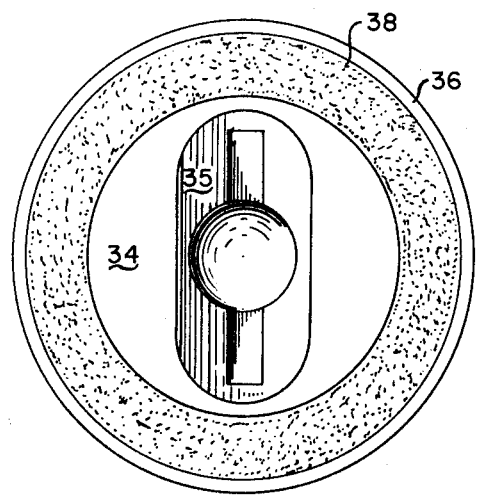
FIG. 4 is a top view of a specific platform embodiment useful in the instrument of the invention.

In operation of the apparatus of the invention hand grip 28 is squeezed, thereby creating an opening between pads 31 and 38 of platforms 32 and 34. A lens workpiece 40 is inserted and roughly centered in said opening thereby forcing at least some lateral translation of wheel 60 by contact of the circumference of the lens 40 with surface 68 of said wheel 60. Next, pressure on hand grip 28 is diminished to below the working force of spring 22, thereby causing said lens workpiece 40 to be gripped securely between said platforms 32 and 34. In this context, it is to be noted that the circumference measuring steps employing the apparatus of the invention will generally occur following edge grinding of the lens. Accordingly, the lens workpiece 40 will often arrive at the circumference measuring step having attached to one of the planar surfaces thereof a grinding chuck. Such chucks normally comprise a soft metal stub structure which is adhered to and extends perpendicularly from the central portion of the lens surface. Of course, if desired, the chuck may be removed from the lens prior to insertion thereof into the apparatus of the invention. However, in a preferred embodiment of our instrument provision is made in platform 34 to accept said lens 40 with the grinding chuck attached thereto. Referring specifically to FIG. 4, this capability is readily achieved by providing a concavity 35 in the lens bearing surface of platform 34 of suitable size, shape and depth to receive and/or engage the chuck. Alternatively, or additionally, said concavity 35 may be provided in rotatable platform 32, if desired. Thus, by virtue of the platform construction depicted in FIG. 4, both chucked and unchucked lenses may be suitably engaged in the rotating means of the instrument.

In the next step of operations the driven platform 34 is rotated into its start position which is signalled by engagement of the tip 52 of leaf spring 50 with a slot 46 of drive shaft 42. The measuring wheel 60 is then set to its "zero" position with respect to pointer 67 and the circumference measurement cycle achieved by manual rotation of the platform 34 (and the lens carried thereon) through 360°. By virtue of the resilient biasing of surface 68 of wheel 60 against the lens perimeter, the lens workpiece need not be circular in shape but may be of any planform conventionally employed in eyeglass lens construction. As previously indicated, the completion of the measuring cycle is signalled by engagement of spring tip 52 with slot 46. The measured circumference of the lens is then read directly from the scale. Employing the instrument of the invention as described hereinbefore, we have been able to consistently measure eyeglass lens circumferences within ½ millimeter. Such accuracy is, of course, well within that required to properly fit the lenses to their intended frames.

The materials of construction useful in the fabrication of the instrument of the present invention will, in general, be obvious to those skilled in the instrument design art. Various metals and polymeric materials such as polyamide resins, polycarbonate resins, glass reinforced polyesters or polyepoxides, white metal, cast iron, steel and other ferrous metals and alloys thereof are all normally useful as materials of construction for the major elements of the instrment. Bearing in mind, however, that a principal advantage of the structure of the invention relates to its relatively light weight and portability, it is obvious that light metals such as magnesium, aluminum, titanium and various alloys thereof are desirably employed at least for the more massive parts thereof, e.g., pincer arms 12 and 14. Likewise, it is generally desirable that freely rotatable measuring wheel or cylinder 60 be composed of a low mass material such as aluminum, phenolic or cast acrylic polymer. With respect to leaf spring 50, any suitable conventional spring stock may be employed such as various tempered steels, beryllium/copper alloys or phosphor bronze alloys.

Obviously, many changes can be made in the above description of the instrument without departing from the spirit and intent of the invention. For instance, the relative positions of the driven and freely rotatable platforms may be reversed by placing the driven platform on the upper jaw of the pincer means instead of on the lower jaw as explicitly disclosed above. Indeed, if desired, both platforms may be driven through appropriate drive shaft linkages to each, provided, of course, that the particular platform not affirmatively driven during the measurement operation remains freely and passively rotatable.

Also, the indexing assembly can comprise, in lieu of the specific slot/leaf spring assembly described above, a biased plunger/detent assembly. In this instance, drive shaft 42 will comprise a detent while a plunger means is resiliently biased thereinto from a suitable housing on lower jaw member 20. This latter construction, however, will generally be found to result in a substantial increase in complexity over the previously described slot/spring indexing arrangement.

With respect to the measuring wheel assembly, another suitable alternative to that construction explicitly disclosed hereinbefore resides in the use of a shaft driven digital counter. In this case the shaft or a wheel mounted on said shaft is urged against the lens circumference. By appropriate gearing and/or sizing of the lens contacting surface of the shaft portion, a direct digitally presented readout of the lens circumference data can be achieved. Again, however, this last mentioned embodiment is generally achievable only at some expense in terms of increased complexity over the preferred measuring wheel/scale assembly described previously.

Finally, while the above description of the instrument has been explicitly concerned with lens circumference measurement, it is obvious that our apparatus can find useful application in the circumferential measurement of substantially any disc-shaped ware.

Accordingly, the invention may be carried out in specific ways other than those set forth herein without departing from the spirit and essential characteristics thereof. Thus, the hereinbefore-described embodiments are to be considered in all respects as illustrative and not limiting, and all changes coming within the meaning and equivalency range of the appended claims are intended to be embraced therein.

What is claimed is:

1. A lens circumference measuring instrument comprising, in combination:

pincer means comprising pivotally engaged upper and lower pincer arm members, each said arm member comprising a jaw member and a handle member therefor, means to resiliently urge said jaw members to the closed position, said handle members, in combination, comprising hand grip means adapted to open said jaw members by squeezing thereof;

rotatable platforms extending inwardly and coaxially from each of said jaw members and adapted to grip a lens workpiece substantially horizontally therebetween, at least one of which platforms is adapted for manual rotation by fixation thereof to drive shaft means, said drive shaft means extending outwardly from said platform and terminating outside its respective jaw member in means for manual rotation thereof, said other platform being freely and passively rotatable in response to rotation of said manually rotatable platform with a lens workpiece gripped therebetween;

means associated with said manually rotatable platform to index and signal the start and completion of 360° of rotation thereof, said means comprising a depression provided in the surface of said drive shaft means and engaging means in fixed position relative to rotational motion of said drive shaft means, said engaging means being resiliently biased to engage said depression in overrideable locking relationship therewith in at least one direction of rotation of said drive shaft means; and freely rotatable and laterally translatable measuring wheel means resiliently biased to bear the circumference thereof in conforming relationship against the circumference of a lens workpiece gripped between said platforms, said measuring wheel means including scale means adapted to provide circumferential measurement of said lens workpiece in response to rotation of said measuring wheel by said lens workpiece.

2. The instrument of claim 1 wherein (a) said drive shaft means has a diameter of at least ½ inch at the locus of said depression and (b) said depression is located intermediate said manually rotatable platform and its corresponding jaw member.

3. The instrument of claim 1 wherein said depression is a vertical slot and said engaging means comprises a leaf spring having a projecting tip on its free end which is biased against said drive shaft means and the other end of which spring is affixed to the pincer arm member associated with the said drive shaft means.

4. The instrument of claim 3 wherein said slot and said engaging projecting tip are v-shaped.

5. The instrument of claim 1 wherein at least one of said platforms is provided with a concavity of sufficient size and depth and of appropriate shape to receive a lens chuck adhering to and extending from a surface of a lens workpiece.

6. The instrument of claim 1 wherein the lens gripping surface of each platform is provided with a resilient pad.

7. The instrument of claim 1 wherein the means providing lateral translation of said measuring wheel means comprises a pivot arm, the free end of which arm bears said freely rotatable wheel means thereon and the other end of which arm is laterally pivotally attached to one of said pincer arm members.

8. The instrument of claim 7 wherein said arm is pivotally attached to a laterally protruding stanchion extending from said pincer arm member.

9. The instrument of claim 1 wherein the circumferential surface of said measuring wheel means comprises an elastomeric material covering having a thickness no greater than about 1/16 inch.

10. The instrument of claim 1 wherein said depression is a detent and said engaging means comprises a plunger means biased against said drive shaft means and which plunger means is housed in the pincer arm member associated with said drive shaft means.

* * * * *